(12) United States Patent
Minetomo et al.

(10) Patent No.: US 12,107,731 B2
(45) Date of Patent: Oct. 1, 2024

(54) INFORMATION PROCESSING SYSTEM, INFORMATION PROCESSING APPARATUS, SERVER APPARATUS, CONTROL METHOD, AND STORAGE MEDIUM

(71) Applicant: Canon Kabushiki Kaisha, Tokyo (JP)

(72) Inventors: Yuki Minetomo, Kanagawa (JP); Nobuhiro Tagashira, Chiba (JP); Takami Eguchi, Tokyo (JP); Ayuta Kawazu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/153,405

(22) Filed: Jan. 12, 2023

(65) Prior Publication Data

US 2023/0231769 A1    Jul. 20, 2023

(30) Foreign Application Priority Data

Jan. 18, 2022   (JP) .................................. 2022-005820

(51) Int. Cl.
 *G06F 3/12*   (2006.01)
 *H04L 9/40*   (2022.01)
 *H04L 41/084*   (2022.01)

(52) U.S. Cl.
 CPC ...... *H04L 41/0846* (2013.01); *H04L 63/0876* (2013.01)

(58) Field of Classification Search
 None
 See application file for complete search history.

(56) References Cited

U.S. PATENT DOCUMENTS

| | | | | |
|---|---|---|---|---|
| 7,730,225 B2* | 6/2010 | Mizuno | ............ | G03G 15/5091 710/16 |
| 2005/0286071 A1* | 12/2005 | Faynor | ............ | G06K 15/1806 358/1.15 |
| 2008/0052384 A1* | 2/2008 | Marl | ............ | H04L 12/2807 709/224 |
| 2008/0294845 A1* | 11/2008 | Kawajiri | ............ | H04N 1/00347 711/115 |

(Continued)

FOREIGN PATENT DOCUMENTS

| | | |
|---|---|---|
| JP | 2015049824 A | 3/2015 |
| JP | 6514632 B2 * | 5/2019 |
| JP | 2020181228 A | 11/2020 |

*Primary Examiner* — Christopher B Robinson
(74) *Attorney, Agent, or Firm* — Venable LLP

(57) ABSTRACT

An information processing system comprising a first apparatus and a second apparatus, wherein the first apparatus includes: a collection unit that collects information on a surrounding environment of the first apparatus; a determination unit that determines an installation environment of the first apparatus based on the information; a detection unit that detects the second apparatus present under an installation environment identical to the installation environment; a generation unit that generates a setting template for setting the second apparatus based on the installation environment; and a transmission unit that transmits the setting template to the second apparatus, and the second information processing apparatus includes: a reception unit that receives the setting template; and an application unit that applies the received setting template to the second apparatus.

19 Claims, 13 Drawing Sheets

(56) References Cited

U.S. PATENT DOCUMENTS

| | | | |
|---|---|---|---|
| 2009/0044248 A1* | 2/2009 | Nakamura | H04L 63/20 |
| | | | 713/193 |
| 2013/0250350 A1* | 9/2013 | Odajima | H04N 1/00204 |
| | | | 358/1.15 |
| 2014/0071495 A1* | 3/2014 | Asada | G06F 3/1285 |
| | | | 358/1.18 |
| 2014/0298291 A1* | 10/2014 | Yoshimi | G06F 8/76 |
| | | | 717/121 |
| 2015/0193618 A1* | 7/2015 | Takano | G06F 8/65 |
| | | | 726/23 |
| 2019/0265920 A1* | 8/2019 | Fujii | H04L 41/0846 |
| 2020/0004477 A1* | 1/2020 | Morita | G06F 3/1232 |

* cited by examiner

FIG. 5

| SETTING ITEM | SOHO | INTRANET | PUBLIC | ISOLATION ENVIRONMENT |
|---|---|---|---|---|
| TLS | ON | ON | ON | — |
| THE FIREWALL | ON | — | ON | — |
| WALL SHARING | OFF | — | OFF | — |

| ITEM | SETTING |
|---|---|
| TLS | OFF |
| THE FIREWALL | OFF |
| WALL SHARING | ON |
| NetBIOS | ON |

602

| ITEM | SETTING |
|---|---|
| TLS | ON |
| THE FIREWALL | ON |
| WALL SHARING | OFF |

FIG. 7

| SETTING ITEM |
|---|
| SMB v1 |
| AppleTalk |
| ... |

701

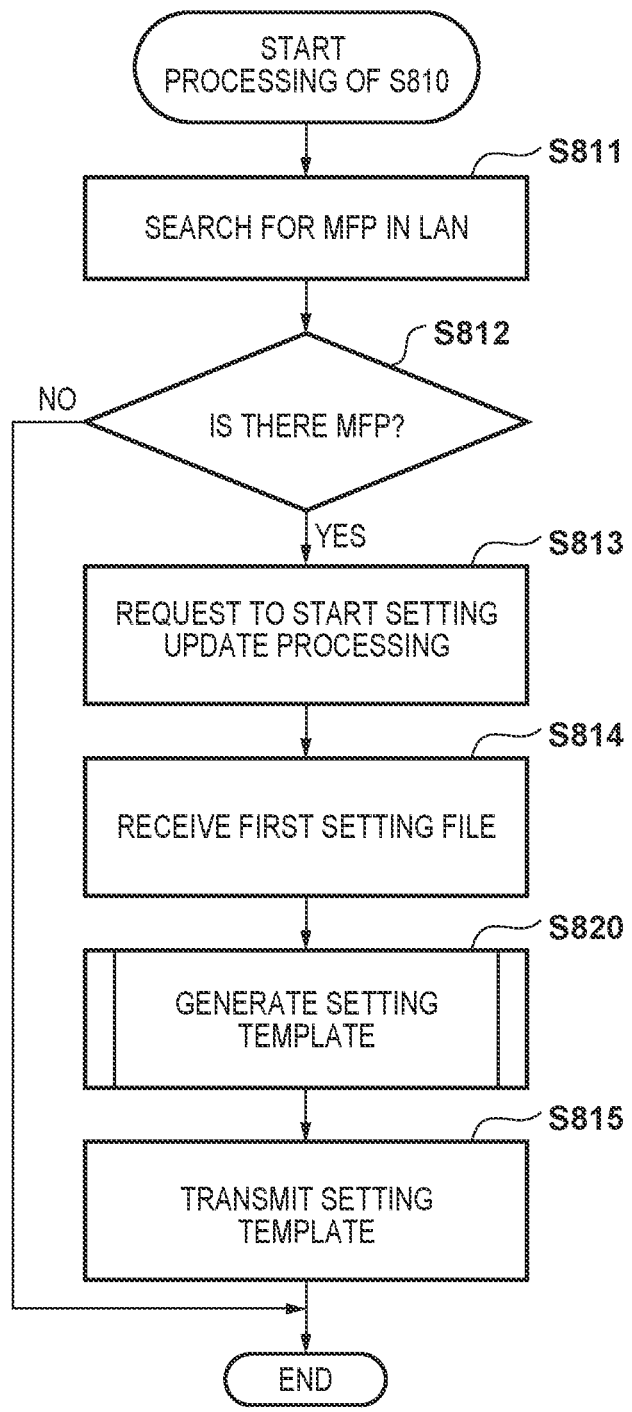

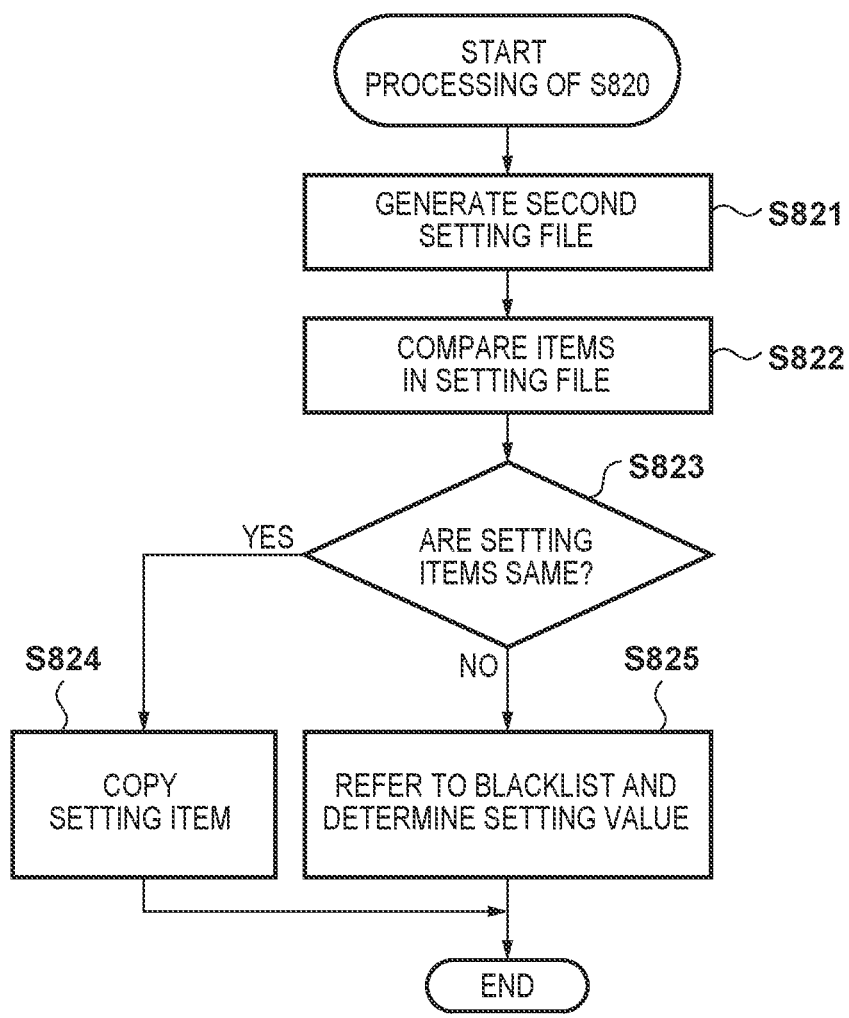

| MODEL ID | SOHO | INTRANET | PUBLIC |
|---|---|---|---|
| A | SOHO_A | INTRANET_A | PUBLIC_A |
| B | SOHO_B | INTRANET_B | PUBLIC_B |
| C | SOHO_C | INTRANET_C | PUBLIC_C |

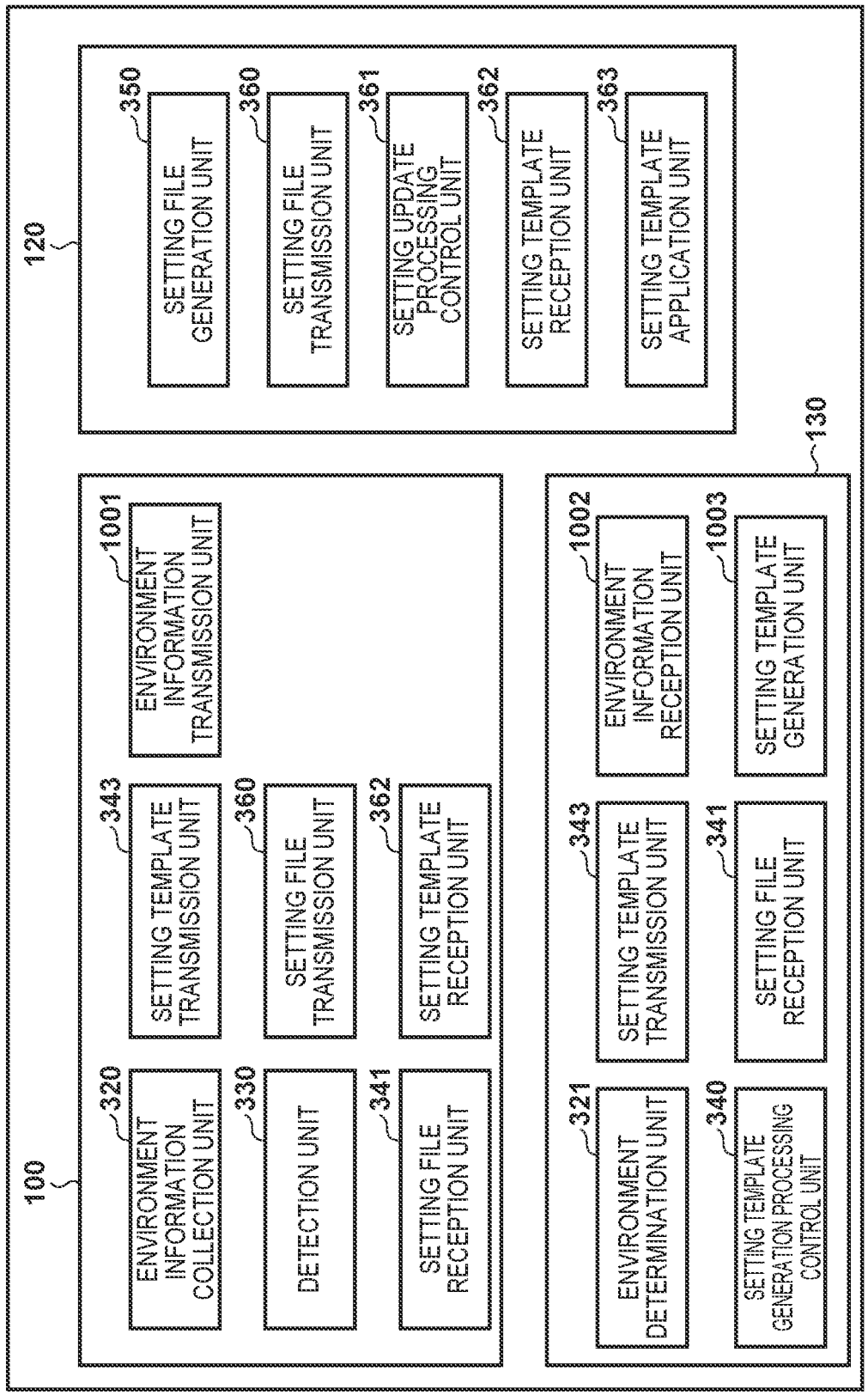

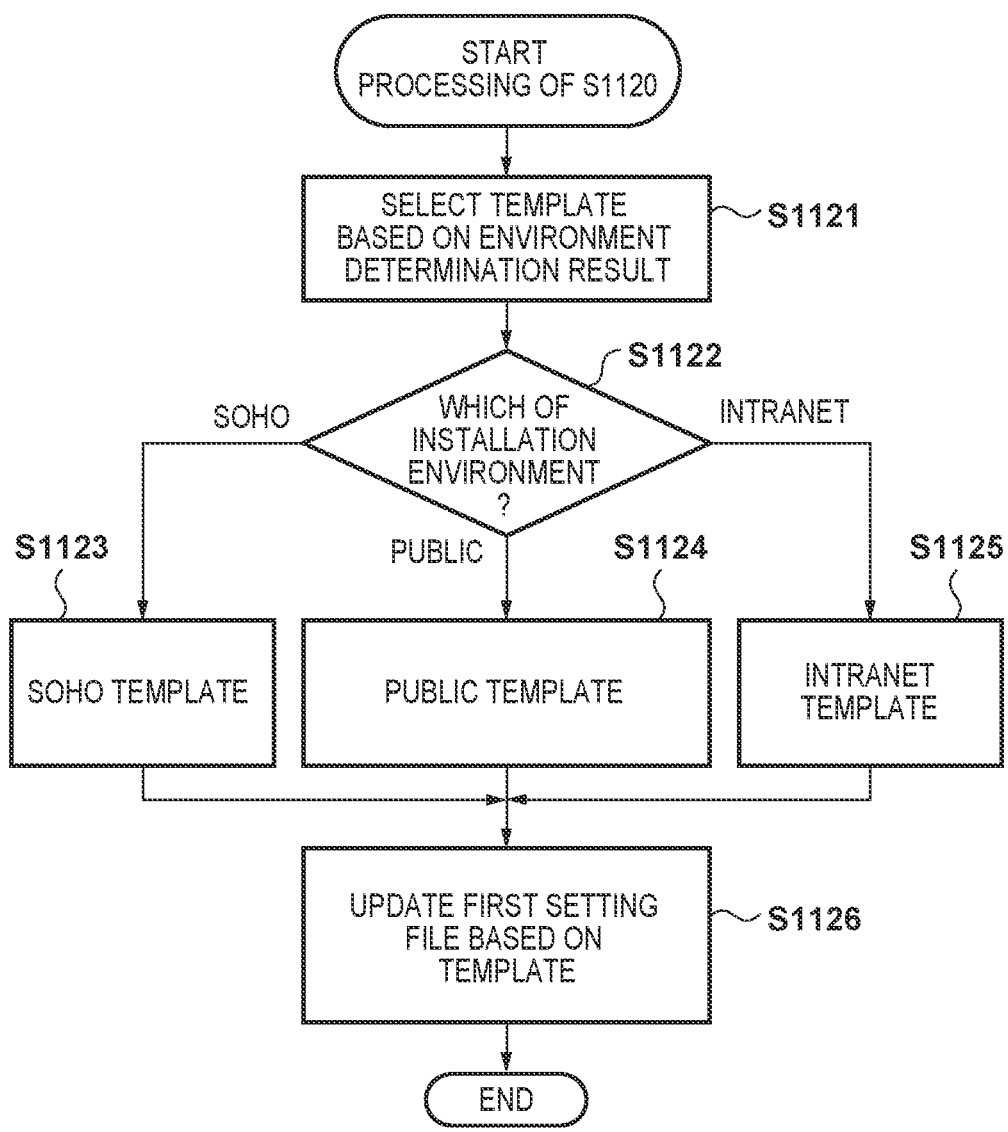

INFORMATION PROCESSING SYSTEM, INFORMATION PROCESSING APPARATUS, SERVER APPARATUS, CONTROL METHOD, AND STORAGE MEDIUM

BACKGROUND OF THE INVENTION

Field of the Invention

The present invention relates to an information processing system, an information processing apparatus, a server apparatus, a control method, and a storage medium.

Description of the Related Art

In recent years, an environment surrounding an information processing apparatus has been changing in various ways. Conventionally, the information processing apparatus installed in a company has been defended from an external attack by a network perimeter of the company. However, the office environment diversifies, and in accordance with it, an environment in which the information processing apparatus is installed has been changing. Examples of the environment include teleworking, a satellite office, and a rental office. To guarantee security of the information processing apparatus installed in such a variety of environments, a security setting suitable for the environment needs to be performed.

In Japanese Patent Laid-Open No. 2020-181228, an environment in which an image processing apparatus is installed is determined and a security policy suitable for the installation environment is automatically applied. Thus, a security setting suitable for the installation environment is achieved without selection of the security policy by a user.

In Japanese Patent Laid-Open No. 2015-49824, settings are performed on one or more information processing apparatuses existing within the identical network to apply collective settings to all of the information processing apparatuses.

However, with the technology of Japanese Patent Laid-Open No. 2020-181228, it is difficult to guarantee the security of the entire user environment. In a case where there is a plurality of types of information processing apparatuses installed in the user environment and an information processing apparatus that does not have a function of automatically setting the security policy suitable for the environment is present, the user himself/herself needs to perform the setting on the information processing apparatus. In addition, with the technology of Japanese Patent Laid-Open No. 2015-49824, it is difficult to perform the security settings suitable for an environment. In Japanese Patent Laid-Open No. 2015-49824, the user himself/herself needs to accurately recognize the installation environment and select the appropriate settings.

SUMMARY OF THE INVENTION

The present invention has been made in view of the above problems, and provides a technology for easily setting a setting template suitable for an installation environment to an information processing apparatus under a user environment.

According to one aspect of the present invention, there is provided an information processing system, comprising: a first information processing apparatus; and a second information processing apparatus, wherein the first information processing apparatus includes: a collection unit configured to collect information on a surrounding environment of the first information processing apparatus; a determination unit configured to determine an installation environment of the first information processing apparatus based on the information; a detection unit configured to detect the second information processing apparatus present under an installation environment identical to the installation environment; a generation unit configured to generate a setting template for setting the second information processing apparatus based on the installation environment; and a transmission unit configured to transmit the setting template to the second information processing apparatus, and the second information processing apparatus includes: a reception unit configured to receive the setting template; and an application unit configured to apply the setting template received by the reception unit to the second information processing apparatus.

Further features of the present invention will become apparent from the following description of exemplary embodiments (with reference to the attached drawings).

BRIEF DESCRIPTION OF THE DRAWINGS

FIG. 5 is a diagram illustrating a security template for each environment of the MFP 100 according to a first embodiment.

FIG. 6 is a diagram illustrating setting files of the MFP 100 and the MFP 120 according to the first embodiment.

FIG. 7 is a diagram illustrating a blacklist of setting items according to the first embodiment.

FIG. 8A, FIG. 8B, FIG. 8C, and FIG. 8D are flowcharts depicting procedures of processing according to the first embodiment.

FIG. 9 is a diagram illustrating a setting template selection table according to the first embodiment.

FIG. 10 is a diagram illustrating device configurations of the MFP 100, the MFP 120, and a server 130 according to a second embodiment.

FIG. 11A, FIG. 11B, and FIG. 11C are flowcharts depicting procedures of processing according to the second embodiment.

DESCRIPTION OF THE EMBODIMENTS

Figure 1:
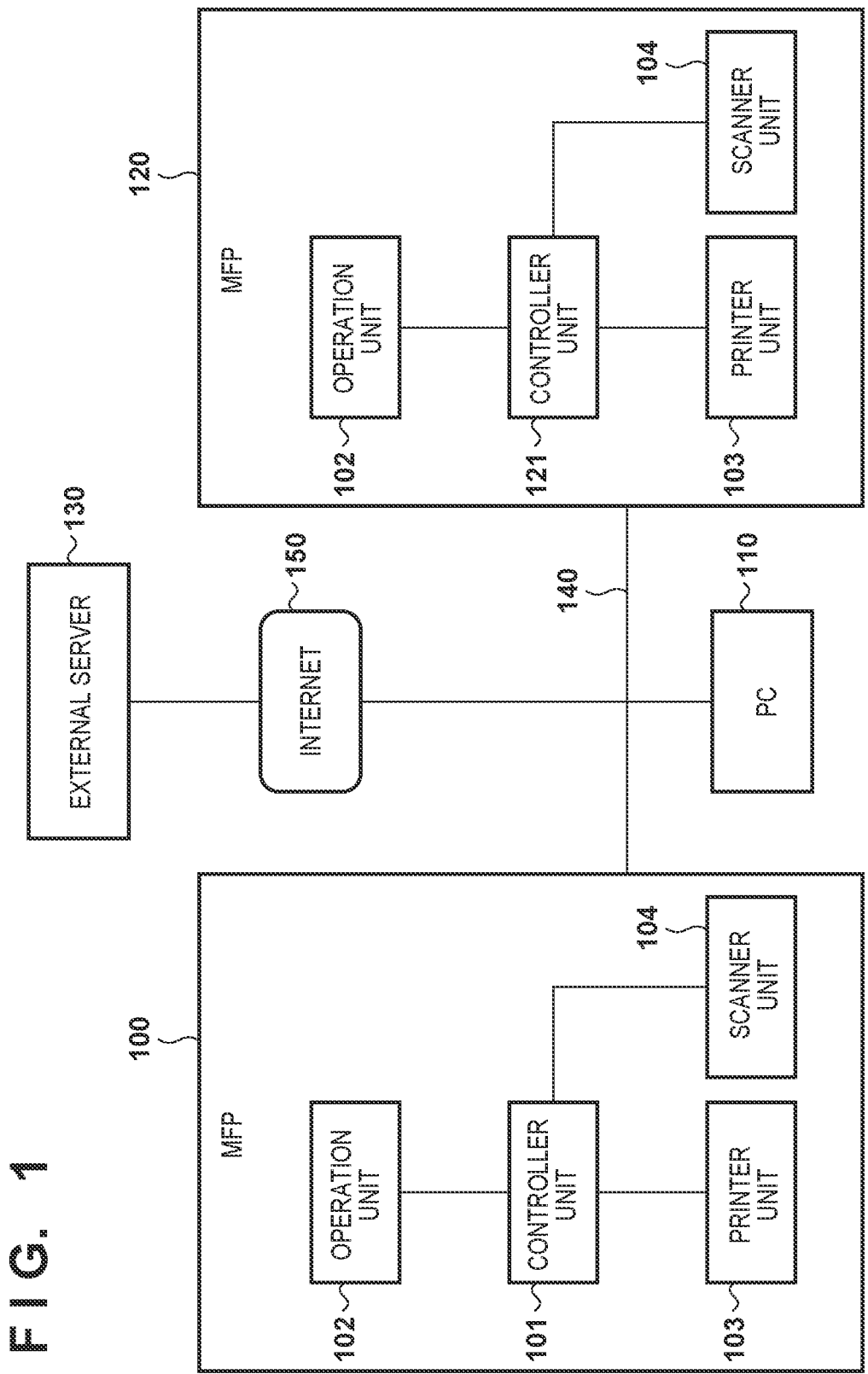
FIG. 1 is a block diagram illustrating a connection configuration between an MFP and peripheral devices according to the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the present embodiment, processing of an information processing apparatus having an environment determination function for determining an installation environment that detects an information processing apparatus present under the identical environment, generates a setting template suitable for the environment for the detected information processing apparatus, and distributes it will be described. In embodiments of this document, a multi-function peripheral (MFP) as an image forming apparatus will be described as an example of an information processing apparatus, but the present invention is a technology applicable to an information processing apparatus other than the MFP.

First Embodiment

Configuration of Information Processing System

With reference to FIG. 1, a connection configuration of the MFP and peripheral devices according to the present invention will be described. The MFP 100, a Personal Computer (PC) 110, and an MFP 120 are connected via a LAN 140. Although the MFP 120 and the MFP 100 are from the identical vendor, but are different models. The PC 110 performs processing, such as transmission and reception of a print job and a scan job, to the MFP 100. Additionally, an external server 130 (server apparatus) communicates with the MFP 100 and the MFP 120 through an internet 150. The MFP 100 includes an operation unit 102 for a user to perform input/output. The MFP 100 includes a printer unit 103 that outputs electronic data to a paper medium. The MFP 100 includes a scanner unit 104 that converts the paper medium into read electronic data.

The operation unit 102, the printer unit 103, and the scanner unit 104 are connected to a controller unit 101 and achieve a function as the multi-function peripheral in accordance with control by the controller unit 101. The client PC 110 performs processing, such as transmission and reception of a print job and a scan job, to the MFP 100. Note that the operation unit 102, the printer unit 103, and the scanner unit 104 provided with the MFP 120 have identical functions as those of the MFP 100, and therefore the identical numbers are given and the description thereof will be omitted. However, a controller unit 121 in the MFP 120 has functions illustrated in FIG. 4 described later and has functions different from the controller unit 101 in the MFP 100 having functions of FIG. 3 described later, and therefore different numbers are given.

Hardware Configuration of Controller Unit 101

Figure 2:
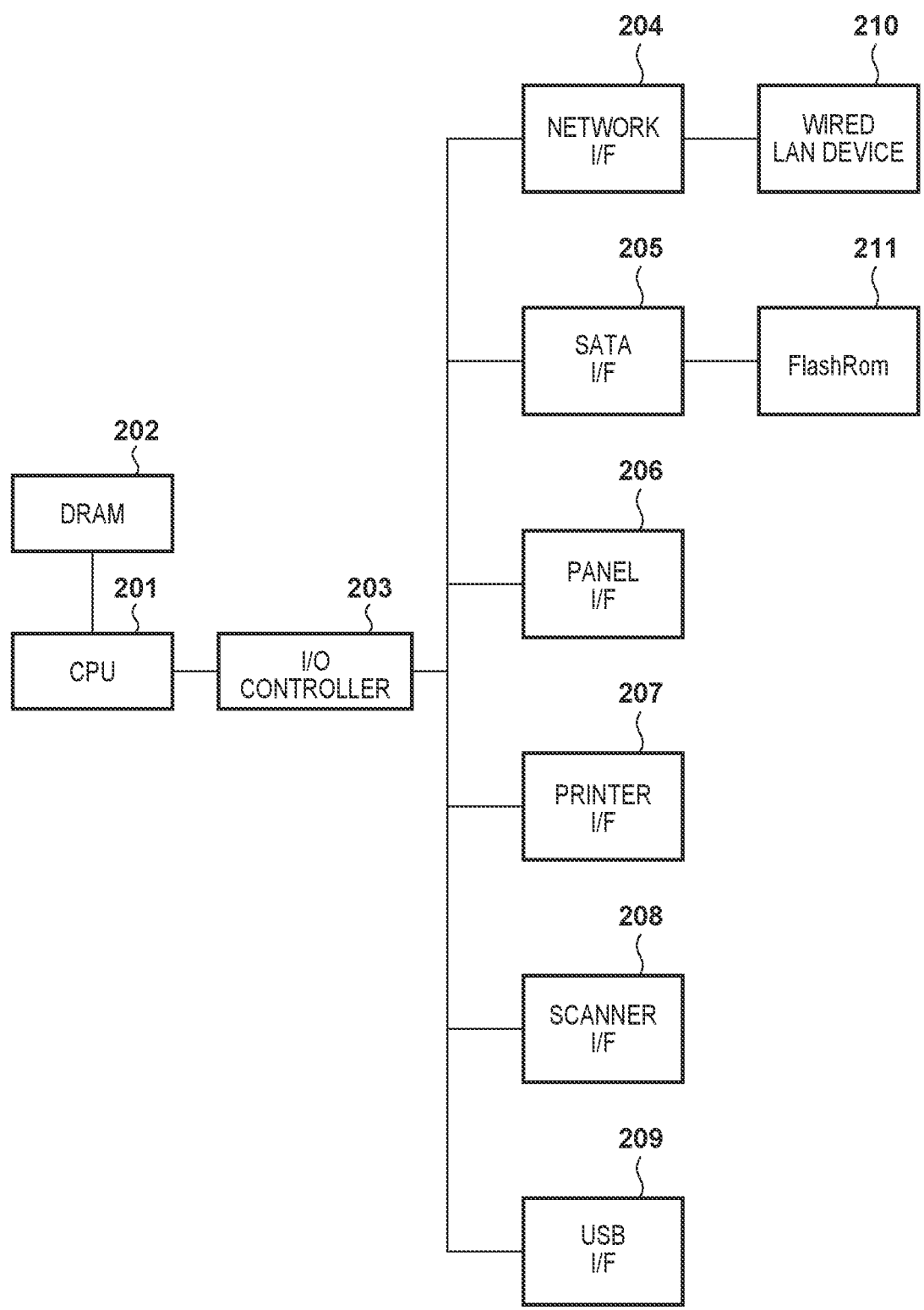
FIG. 2 is an internal configuration diagram of a controller unit of the MFP according to the present invention.

FIG. 2 is a block diagram illustrating a physical configuration of the controller unit 101 in the MFP 100. Note that the configuration of the controller unit 121 in the MFP 120 is similar to the configuration of the controller unit 101, and thus the description thereof will be omitted. A CPU 201 executes main arithmetic processing in the controller unit. The CPU 201 is connected to a DRAM 202 via a bus. The DRAM 202 is used by the CPU 201 as a work memory for temporarily locating program data representing an arithmetic instruction in a process of operation by the CPU 201 and data to be processed. The CPU 201 is connected to an I/O controller 203 via the bus. The I/O controller 203 performs input/output to/from various devices in response to an instruction from the CPU 201. To the I/O controller 203, a Serial Advanced Technology Attachment (SATA) I/F 205 is connected, and a Flash ROM 211 is connected ahead of the SATA I/F 205. The CPU 201 uses the Flash ROM 211 to permanently store a program to achieve the function of the MFP and a document file. A network I/F 204 is connected to the I/O controller 203. A wired LAN device 210 is connected ahead of the network I/F 204.

The CPU 201 controls the wired LAN device 210 via the network I/F 204 to achieve communications on the LAN 140. Additionally, a panel I/F 206 is connected to the I/O controller 203, and the CPU 201 achieves input/output for a user to the operation unit 102 via the panel I/F 206. Additionally, a printer I/F 207 is connected to the I/O controller 203, and the CPU 201 achieves output processing of a paper medium using the printer unit 103 via the printer I/F 207. In addition, to the I/O controller 203, a scanner I/F 208 is connected, and the CPU 201 achieves reading processing of a document using the scanner unit 104 via the scanner I/F 208. Also, a USB I/F 209 is connected to the I/O controller 203, and any device connected to the USB I/F 209 is controlled.

To execute a copy function, the CPU 201 reads program data from the Flash ROM 211 to the DRAM 202 via the SATA I/F 205. In accordance with the program read to the DRAM 202, the CPU 201 detects a copy instruction from the user to the operation unit 102 via the panel I/F 206. When the CPU 201 detects the copy instruction, the CPU 201 receives the document from the scanner unit 104 via the scanner I/F 208 as electronic data and stores it in the DRAM 202. The CPU 201 executes, for example, color conversion processing suitable for output on image data stored in the DRAM 202. The CPU 201 transfers the image data stored in the DRAM 202 to the printer unit 103 via the printer I/F 207, and performs output processing on a paper medium.

In a case where Page Design Language (PDL) print is performed, the client PC 110 performs a print instruction via the LAN 140. The CPU 201 reads program data from the Flash ROM 211 to the DRAM 202 via the SATA I/F 205. The print instruction is detected in accordance with the program data read to the DRAM 202 via the network I/F 204. When the CPU 201 detects a PDL transmission instruction, the CPU 201 receives the print data via the network I/F 204, and stores the print data on the Flash ROM 211 via the SATA I/F 205. When storage of the print data is completed, the CPU 201 loads the print data stored in the Flash ROM 211 as image data to the DRAM 202. The CPU 201 executes, for example, color conversion processing suitable for output on image data stored in the DRAM 202. The CPU 201 transfers the image data stored in the DRAM 202 to the printer unit 103 via the printer I/F 207, and performs output processing on a paper medium.

Hereinafter, the functional configuration and the processing flow according to the present embodiment will be described.

Functional Configuration

Figure 3:
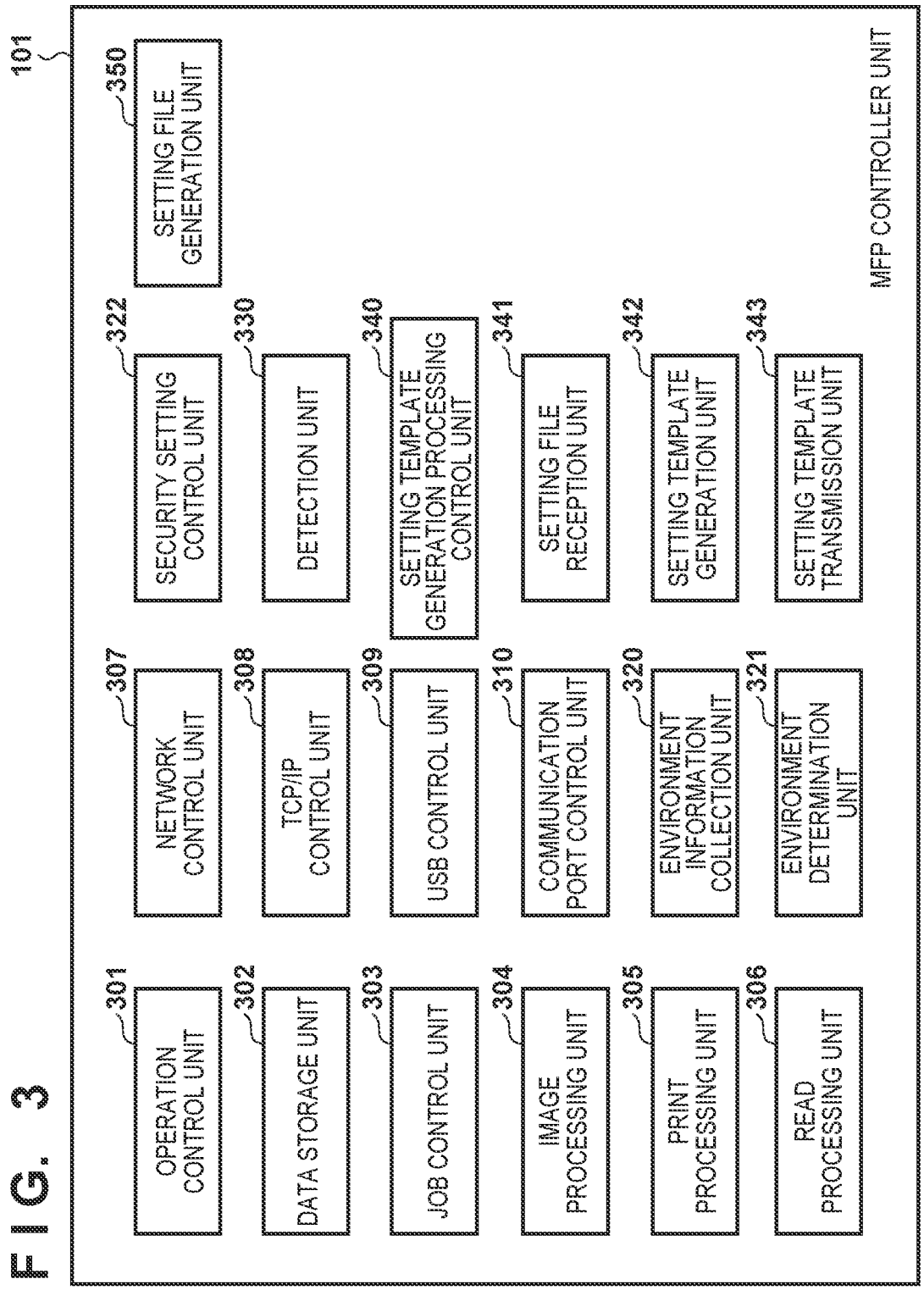
FIG. 3 is a diagram illustrating a device configuration of an MFP 100 according to the present invention.

Next, with reference to the block diagram in FIG. 3, an example of the functional configuration in which software executed by the controller unit 101 in the first MFP 100 according to the first embodiment is achieved will be described. An operation control unit 301 displays a screen image for a user on the operation unit 102, detects a user operation, and performs processing associated with a screen component, such as a button, displayed on the screen. A data storage unit 302 stores data or reads data in/from the Flash ROM 211 upon a request from another control unit. For example, when the user desires to change any device setting, the operation control unit 301 detects contents input by the user on the operation unit 102, and the data storage unit 302 stores the content in the Flash ROM 211 as a setting value upon a request from the operation control unit 301.

A job control unit 303 controls job execution in accordance with the instruction from another control unit. An image processing unit 304 processes the image data in a format suitable for each application according to the instruction from the job control unit 303. A print processing unit 305 prints an image on a paper medium via the printer I/F 207 in response to the instruction from the job control unit 303 and outputs it. A read processing unit 306 reads a placed document via the scanner I/F 208 in response to the instruction from the job control unit 303.

A network control unit 307 performs a network setting, such as an IP address, on a TCP/IP control unit 308 at the start of the system and detection of setting change in accordance with the setting value stored in the data storage unit 302. The TCP/IP control unit 308 performs transmission and reception processing of a network packet via the network I/F 204 in response to an instruction from another control unit. A USB control unit 309 controls the USB I/F 209, and controls any USB-connected device. A communication port control unit 310 controls ports used when the TCP/IP control unit 308 transmits and receives packets.

An environment information collection unit 320 collects information on the setting value of the first MFP 100 stored in the data storage unit 302 at the start of operation. Information on surrounding environment of the first MFP 100, such as packets received by the first MFP 100 from the connected device, such as the PC 110, the second MFP 120, and the server 130, via the LAN 140 and a response of the packet transmitted to a device within the network by the first MFP 100 are collected. The information on the setting value of the first MFP 100 includes, for example, an IP address and a type thereof (a global address and a private address) and a setting whether a proxy server is used when the first MFP 100 communicates with a device outside the LAN. Additionally, for example, a setting for a protocol used for communications and a sharing setting of a file stored in the data storage unit 302 in the first MFP 100 are included. The information on surrounding environment of the first MFP 100 includes, for example, a transmission source IP address of the packet received by the first MFP 100 and the type thereof (a global address and a private address), and information on the port used in the communications.

Additionally, for example, Time to Live (TTL) of a packet, a response to an Address Resolution Protocol (ARP) transmitted by the MFP, a response from a DNS server, and information on the second MFP 120 (identification information, such as an IP address and a MAC address) can be included. Here, the information as described above is exemplified as information collected by the environment information collection unit 320, but information that can be collected by the first MFP 100 may be referred to in addition to the information. In the following, the information on the surrounding environment described above may be referred to as "environment information." The collected environment information is stored in the data storage unit 302. In addition, although the environment information collection unit 320 starts processing at the start of operation is exemplified, the processing may start in response to the user instructing the environment information collection unit 320 to start the processing via the operation unit 102.

An environment determination unit 321 determines the installation environment of the first MFP 100 based on the environment information collected by the environment information collection unit 320. The environment determination unit 321 reads the environment information stored in the data storage unit 302 and classifies the environment of the first MFP 100 into predefined environments, such as a SOHO, a public, an intranet, and an isolated environment. Here, the installation environment of the first MFP 100 is exemplified as described above, but may be classified into other environments.

As a method for determining the environment, for example, when the proxy setting of the first MFP 100 or communication from the proxy server is detected, it is determined as an intranet environment where a network perimeter defense by the proxy server is applied. When the network perimeter defense is not applied as in the intranet environment but an operation is performed in a private network, it is determined as a SOHO environment. In a case where an unspecified number of users are accessible in the environment, for example, when a global address is set to the IP address or direct communication with an external server or a client is performed, it is determined as a public environment.

Also, when there is no communication with the Internet environment, it is determined as an isolation environment. Although a rule-based determination method for determining the environment based on the specific condition is exemplified here, environment determination using an AI that learns a relationship between the collected environment information and the determination result of environment may be performed, or the environment may be determined using another method.

A security setting control unit 322 determines the security setting of the first MFP 100 based on the environment determination result by the environment determination unit 321. The security setting is determined according to a setting template, which will be described later with reference to FIG. 5, determined for each environment held by the first MFP 100. The setting template describes a plurality of setting values for the MFP to perform settings suitable for the installation environment as templates. Application of the setting value described in the setting template as the setting of the MFP by the security setting control unit 322 allows setting suitable for the installation environment. Here, although it is exemplified that the security setting is determined according to the setting template held by the first MFP 100, the security setting may be changed individually, or the user may change the security setting. After the termination of processing by the security setting control unit 322, a detection unit 330 described later is requested for start of MFP detection processing.

The detection unit 330 detects an MFP that is under an environment identical to that of the first MFP 100 by the request from the security setting control unit 322. The MFP as the detection target is the MFP present in the network identical to that of the first MFP 100, and an MFP belonging to a different subnet or a different domain is not included. Also, the model of the MFP as the detection target is the model identical to the first MFP 100 or a model different (for example, a model with a version different from that of the first MFP 100 or an inexpensive machine) from the vendor identical to that of the first MFP 100. That is, it can be the identical model or a model of an identical group from the identical vendor. Note that it may be determined that the MFP that can be detected is present in the identical network on the assumption of being separated by, for example, F/W.

As a detection method of the MFP, for example, the first MFP 100 broadcasts ARP packets in the LAN, refers to a vendor ID (vendor information) and a model ID of a MAC address included in the response, and identifies that the MFP is the detection target. Besides, the MFP as the detection target may be identified by the use of a dedicated communication protocol between the MFPs.

After detecting the MFP under the identical environment, the detection unit 330 requests a setting template generation processing control unit 340 described later to start setting template generation processing. Here, it is exemplified that the operation of the detection unit 330 is automatically started after the end of processing by the security setting control unit 322, but the user may instruct the start of processing via the operation unit 102.

The setting template generation processing control unit 340 requests the MFP (the second MFP 120) detected by the detection unit 330 to start setting file update processing for application of the setting template suitable for the environment performed by a setting template generation unit 342 described later. Then, it is waited for reception of a first setting file 601 that describes setting items of the detected MFP described later with reference to FIG. 6.

A setting file reception unit 341 receives the first setting file 601 transmitted by the second MFP 120. Then, after receiving the first setting file 601, the setting template generation unit 342 is requested to start processing.

The setting template generation unit 342 updates the first setting file 601 received by the setting file reception unit 341 to generate a setting template of the second MFP 120. The method first requests a setting file generation unit 350 described later to generate a second setting file 602 that describes setting items for the first MFP 100 described later with reference to FIG. 6. The items of the first setting file 601 are compared with the items of the generated second setting file 602. Regarding the identical item, the setting item of the second setting file 602 is copied to the setting item of the first setting file 601.

Regarding the setting item present only in the first setting file 601, a blacklist 701 of setting items, which will be described later with reference to FIG. 7, is referred to for determination of the setting value. A protocol having known vulnerability and a legacy protocol are registered with the blacklist 701 of the setting items, when the setting items related to them are enabled, they possibly affect the security of the MFP, and thus the setting values are updated to OFF. The update processing is not performed on a setting item not registered with the blacklist 701 of setting items, and the setting item remains in the original setting value. The first setting file 601 updated by the processing is transmitted to the second MFP 120 by a setting template transmission unit 343 described later as the setting template of the second MFP 120.

The setting template transmission unit 343 transmits the generated setting template of the second MFP 120 to the second MFP 120 by the request from the setting template generation unit 342. The setting file generation unit 350 generates a setting file describing own setting items from setting information stored in the data storage unit 302.

Figure 4:
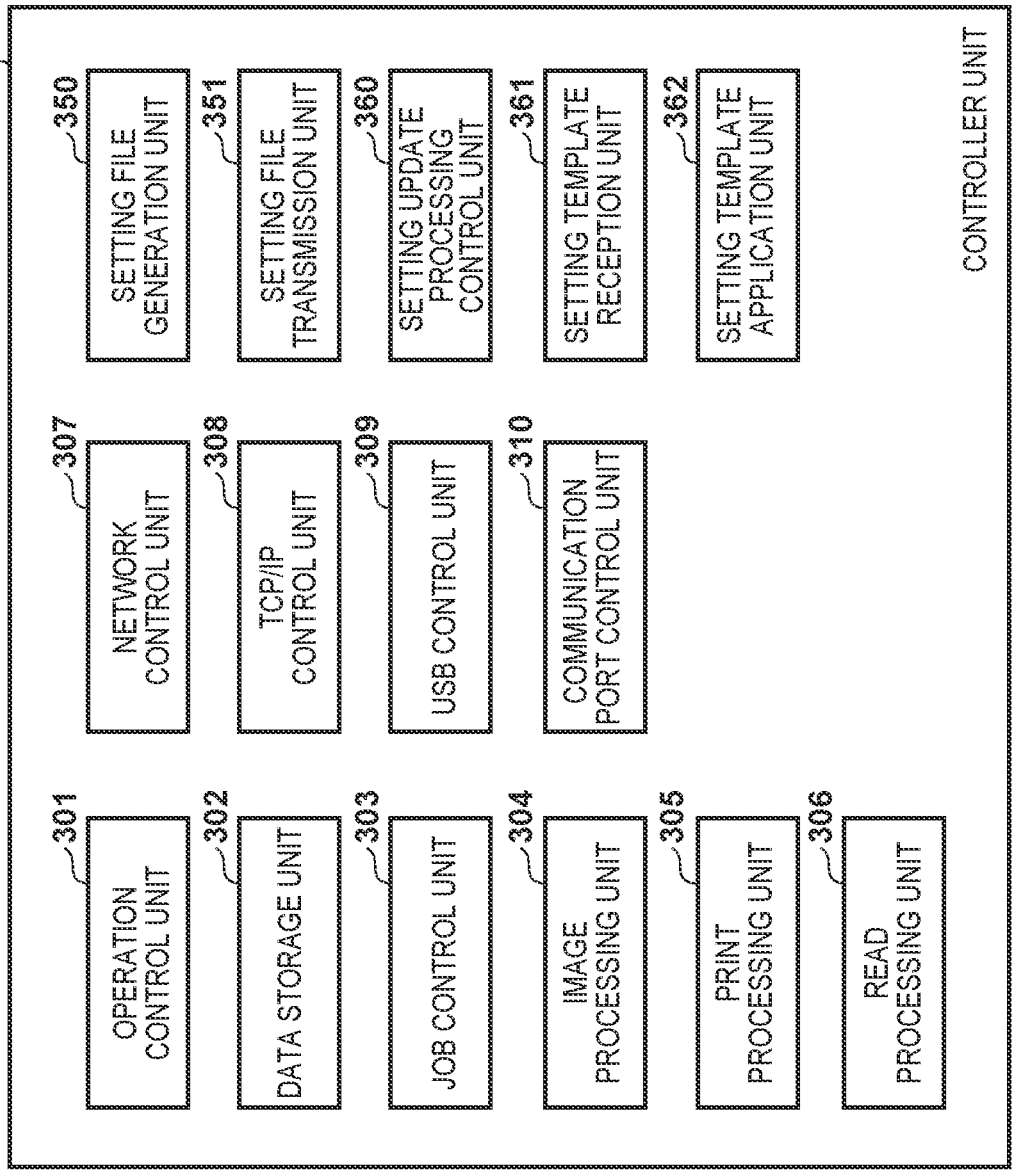
FIG. 4 is a diagram illustrating a device configuration of an MFP 120 according to the present invention.

Next, with reference to the block diagram in FIG. 4, an example of the functional configuration in which software executed by the controller unit 121 in the second MFP 120 according to the first embodiment is achieved will be described. The second MFP 120 is an MFP that is a type different from the first MFP 100, and is an apparatus not having an environment information collection function, an environment determination function, a setting template application function according to an environment, or generation/distribution function of the setting template according to the environment. Note that the identical number is given to the function identical to the function described in the functional configuration of the controller unit 101 in the first MFP 100 illustrated in FIG. 3, and the description thereof will be omitted.

A setting file transmission unit 360 transmits a setting file that describes the setting items for the second MFP 120 to anther MFP.

A setting update processing control unit 361 starts setting update processing when receiving a start request for the setting update processing from the other MFP. First, the setting file generation unit 350 is requested to generate the first setting file 601 in which own setting items are written.

The generated first setting file 601 is transmitted to the MFP that has requested the start of the setting update processing by the setting file transmission unit 360. Note that as measures against spoofing of the MFP that has requested the start of the setting update processing, the processing may be started only in a case where the start of the setting update processing is requested from the MFP that has been registered in advance. Alternatively, authentication may be performed on the transmission source of the start request for setting update processing. For example, a certificate of the MFP is received along with the start request for the setting update processing, and validity of the received certificate is confirmed to, for example, a server of the vendor of the MFP, thus ensuring authentication on the MFP.

A setting template reception unit 362 receives the setting template transmitted from another MFP. A setting template application unit 363 reflects the content of the setting template received by the setting template reception unit 362 to own security setting.

Example of Setting Template

FIG. 5 exemplifies a setting template 501 for each environment held by the first MFP 100. The first MFP 100 reflects the security setting described in the setting template 501 to the first MFP 100 in accordance with the environment determined by the environment determination unit 321. For example, for an intranet environment, assuming communication outside the network perimeter, the communication is encrypted by Transport Layer Security (TLS). In addition, since the defense measures is provided at the network perimeter, any given setting is performed on a firewall of the MFP or file sharing in the network. In addition, in the case of a public environment, since an unspecified number of users are accessible, the firewall of the MFP is enabled, and the file sharing is disabled as measures against an information leakage.

FIG. 6 exemplifies the first setting file 601 and the second setting file 602 that describe the setting items of the MFPs. The first setting file 601 is a setting file that describes the setting items for the MFP as the update target of the security setting. The second setting file 602 is the setting file used in updating the setting items of the first setting file 601. When the setting template generation unit 342 generates the setting template, the first setting file 601 is updated based on the setting items of the second setting file 602.

For example, for the TLS setting, the setting of the first setting file 601 is OFF, and the setting of the second setting file 602 is ON. In updating the setting file, the TLS setting of the first setting file 601 is updated to ON according to the setting of the second setting file 602.

Since setting (not illustrated) of a Server Message Block (SMB) v1 of the first setting file 601 is an item absent in the second setting file 602, the blacklist 701 of the setting items, which will be described later with reference to FIG. 7, is referred to. For example, from the viewpoint of the known vulnerability, the setting items registered with the blacklist 701 of the setting items are recommended to be OFF. Since SMB v1 is registered with the blacklist 701, it is set to OFF.

FIG. 7 exemplifies the blacklist 701 of the setting items. The known vulnerability protocol and the legacy protocol have been registered with the blacklist 701 of the setting items. The setting template generation unit 342 refers to the blacklist 701 of the setting items when the first setting file 601 is updated. The protocols registered with the blacklist 701 of the setting items possibly affect the security of the MFP when used from the perspective of, for example, the known vulnerability and presence of support, and thus the functions are recommended to be OFF. For example, the many known vulnerabilities have been reported in SMB v1, and SMB v1 is an old protocol and not modified. Therefore, it is recommended not to use SMB v1. AppleTalk is a legacy protocol that is not currently used, and when a vulnerability is found, it cannot be handled. Therefore, it is recommended not to use AppleTalk.

Processing Flow

With reference to the flowcharts of FIG. 8A, FIG. 8B, FIG. 8C, and FIG. 8D, the processing flow when the first MFP 100 of the present embodiment generates the setting template of the second MFP 120 and distributes it will be described. Note that FIG. 8A, FIG. 8B, and FIG. 8C are processing performed by the first MFP 100, and FIG. 8D is processing performed by the second MFP 120.

Figure 8A:
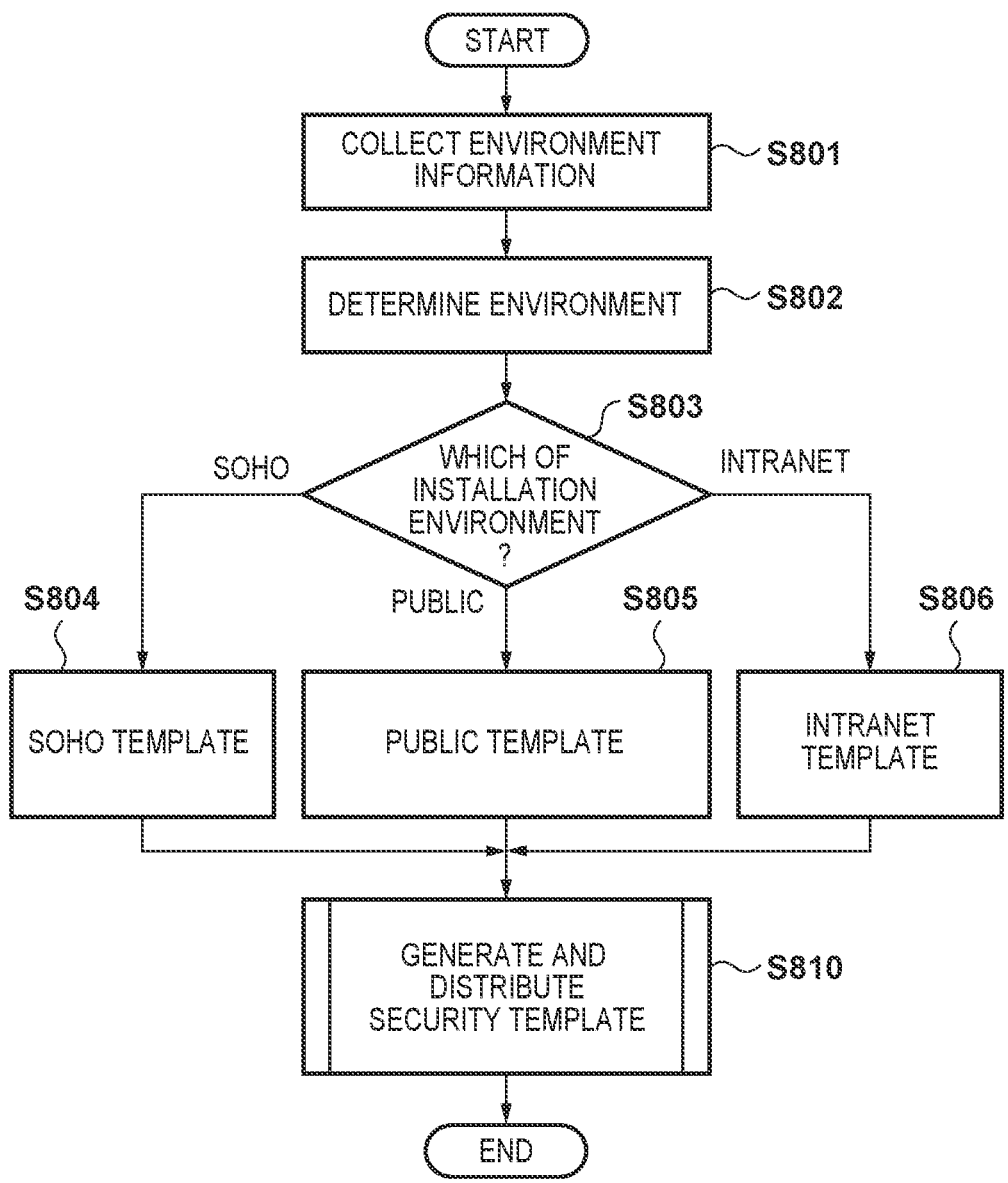
Figures 8D, 9:
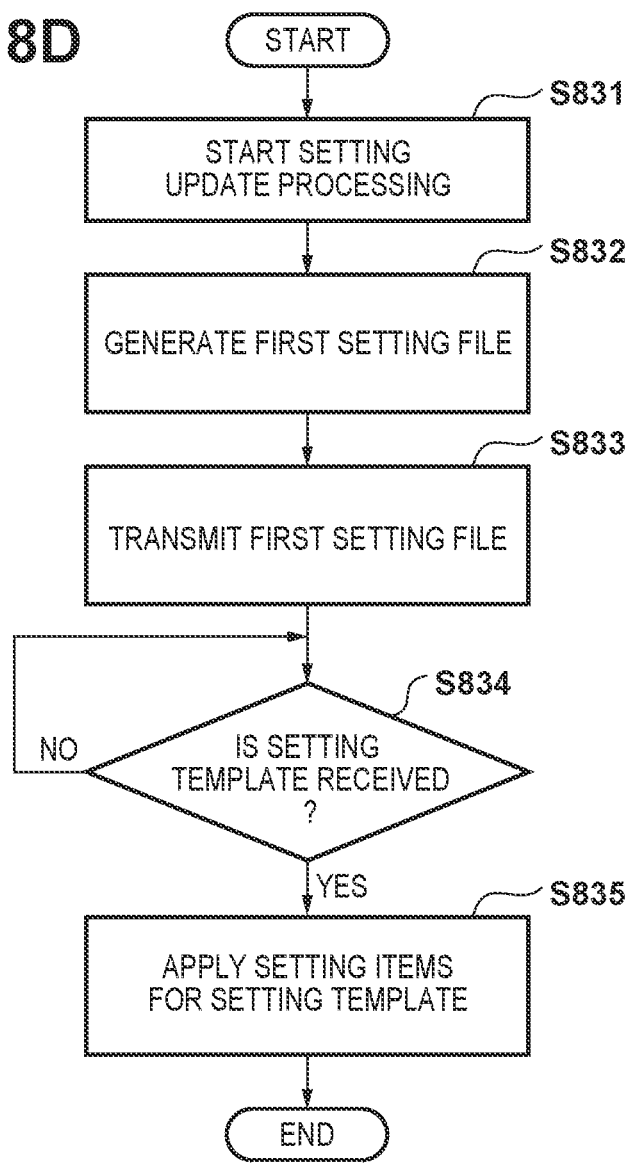

In FIG. 8A, in the first MFP 100, the environment information collection unit 320 collects information on the surrounding environment of the first MFP 100 in response to the start of operation or an instruction from the user (S801). The environment determination unit 321 determines the installation environment of the first MFP 100 based on the collected environment information (S802). Based on the result of the environment determination and the setting template 501 according to the environment, the security setting control unit 322 determines the security setting applied to the first MFP 100 (S803).

For example, when the installation environment of the first MFP 100 is a SOHO, the setting of the SOHO of the setting template 501 is applied (S804). Also, when the installation environment is a public, the setting of the public of the setting template 501 is applied (S805). Then, when the installation environment is an intranet, the setting of the intranet of the setting template 501 is applied (S806). After application of the setting template to the first MFP 100, the setting template is generated and distributed for the MFP present under the identical environment (S810).

Here, using FIG. 8B, details of the processing of generating and distributing the setting template for the MFP present under the identical environment by the first MFP 100 (S810) will be described. First, the detection unit 330 searches for the MFP present under the environment identical to that of the first MFP 100 (S811). When there is no MFP under the identical environment, the processing ends. On the other hand, when another MFP (the second MFP 120) present under the identical environment is detected (S812), a setting template generation processing control unit 340 in the first MFP 100 requests the second MFP 120 to start the setting update processing (S813).

The setting file reception unit 341 in the first MFP 100 receives the first setting file 601 from the second MFP 120 (S814), and the setting template generation unit 342 generates the setting template of the second MFP 120 using the first setting file 601 (S820). After completion of generation of the setting template, the setting template transmission unit 343 transmits the setting template of the second MFP 120 to the second MFP 120 (S815), and the processing ends.

Next, using FIG. 8C, details of generation processing of the setting template (S820) will be described. First, the setting file generation unit 350 generates the second setting file 602, which describes the setting items for the first MFP 100 (S821). Next, the setting template generation unit 342 compares the setting items for the first setting file 601 received from the second MFP 120 and the setting items for the second setting file 602 (S822). Then, regarding the identical setting item, the setting value of the second setting file 602 is copied to the first setting file 601 (S824).

For the setting item present only in the first setting file 601, the blacklist 701 of the setting items is referred to, and the setting items registered with the blacklist 701 of the setting items are updated to OFF (S825). After performing the processing described above on all setting items of the first setting file 601, the processing ends.

Next, using FIG. 8D, setting update processing of the second MFP 120 will be described. In response to a start request of setting update processing from the first MFP 100, the setting update processing control unit 361 in the second MFP 120 starts own setting update processing (S831). The setting file generation unit 350 in the second MFP 120 generates the first setting file 601 (S832), and the setting file transmission unit 360 transmits the first setting file 601 to the first MFP 100 (S833). The second MFP 120 waits for receiving the setting template of the second MFP 120 (S834). After the setting template reception unit 362 receives the setting template of the second MFP 120, a setting template application unit 363 applies the setting items for the setting template of the second MFP 120 to itself (S835), and terminates the processing.

Thus, in the present embodiment, the first MFP 100 can generate and distribute the setting template for the second MFP 120.

First Modification of First Embodiment

In the first embodiment, an example in which the first setting file 601 that describes the setting items for the MFP 120 is updated based on the second setting file 602 that describes the setting items for the MFP 100 to generate the setting template of the second MFP 120 has been described. In contrast, in the present modification, an example in which the setting template used to update the first setting file 601 is selected based on the information on the second MFP 120 (such as the IP address) such that update is performed to have values optimal for the second MFP 120 will be described.

Since the first MFP 100 and the second MFP 120 are present under the identical environment, the surrounding environment, such as the presence of network perimeter and the device in communication with the MFP, can be regarded as identical. However, depending on the setting of the second MFP 120, a case in which they cannot be regarded as in the identical environment is possible. For example, it is assumed that the first MFP 100 and the second MFP 120 are installed in an intranet environment defended by a network perimeter.

When the global address is set to the IP address in the second MFP 120 under the environment, even under the environment in which network perimeter defense is performed, the MFP 120 possibly directly communicates with the outside of the network perimeter, and in that case, a public environment without network perimeter defense is suitable as the installation environment of the second MFP 120. In such a situation, updating the first setting file 601 based on the setting of the first MFP 100 causes a deviation between the security setting and the installation environment, and thus an appropriate setting is not performed.

Thus, when the first setting file 601 is updated, the first MFP 100 refers to only the information on the second MFP 120 among the setting items described in the first setting file 601 and the environment information collected by the first MFP 100. Thus, the environment determination unit 321 determines the installation environment of the second MFP 120. Then, the setting template generation unit 342 selects the setting template suitable for the second MFP 120 again based on the result of determination, and updates the first setting file 601 based on the setting template.

For example, it is assumed that the first MFP 100 selects the settings in the intranet environment of the setting template 501 illustrated in FIG. 5 and any given values are recommended settings for firewall and file sharing settings. When the installation environment of the second MFP 120 is determined as a public during determination of the installation environment, the first setting file 601 is updated based on the template of the public. Thus, different from the recommended settings of the first MFP 100, they are updated to firewall: ON and file sharing: OFF. Here, the selection of the setting template optimum for the MFP 120 through determination of the installation environment of the second MFP 120 is exemplified, but the setting optimum for the second MFP 120 may be determined using, for example, an AI.

In this way, by selecting the setting template used to update the first setting file 601 based on the information on the second MFP 120, update is performed such that the values becomes the values optimal for the second MFP 120.

Second Modification of First Embodiment

In the first embodiment, an example in which the first MFP 100 updates the first setting file 601 received from the second MFP 120 to generate the setting template of the second MFP 120 has been described. In contrast, in the present modification, an example of generating the setting template of the second MFP 120 without the use of the first setting file 601 will be described.

For example, the first MFP 100 selects the setting template optimal for the second MFP 120 from the setting templates that the setting template generation unit 342 has in advance based on the environment information determined by the first MFP 100 and identification information (such as a model ID) of the second MFP 120. For example, the first MFP 100 has a setting template selection table 901 as illustrated in FIG. 9.

The setting template selection table 901 describes a correspondence of the setting template suitable for the setting environment for each model of the MFP. The first MFP 100 uses the setting template selection table 901 to ensure selecting an appropriate setting template from a model ID and the installation environment of the MFP.

For example, in A case where the model ID of the second MFP 120 is "A" and the determination result of the installation environment is an intranet, "INTRA A" as the setting template for an intranet environment of the MFP where the model ID of the setting template selection table 901 is A is selected. The setting template transmission unit 343 in the first MFP 100 transmits the selected setting template to the second MFP 120. The setting template application unit 363 applies the setting template received by the setting template reception unit 362, thus allowing the second MFP 120 to perform the setting optimal for the installation environment.

In this way, the first MFP 100 transmits the setting template of the second MFP 120 without the use of the first setting file 601.

Second Embodiment

Hereinafter, information processing of the second embodiment will be described. Note that, in the second embodiment, the identical reference numerals are provided to configurations similar to those of the first embodiment with detailed description thereof being omitted.

In the first embodiment, an example in which the first MFP 100 determines the installation environment and generates and distributes the setting template for the second MFP 120 has been described. In contrast, in the second embodiment, the server determines the installation environment and generates and distributes the setting template.

Functional Configuration

With reference to the block diagram in FIG. 10, the functional configurations of the MFP and the server according to the second embodiment will be described. The first MFP 100 and the second MFP 120 are substantially identical to those described above with reference to FIG. 3 and FIG. 4. However, the functional configuration of the first MFP 100 partially differs from the that of first embodiment, and thus will be described with reference to FIG. 10. Note that the first MFP 100, the second MFP 120, and the server 130 according to the second embodiment having the numbers identical to those of the function block in FIG. 3 have identical functions, and therefore the descriptions thereof will be omitted.

An environment information transmission unit 1001 in the first MFP 100 transmits the environment information collected by the environment information collection unit 320 to the server 130. Here, the environment information includes information (for example, an IP address and a MAC address) that identifies the second MFP 120 detected by the detection unit 330 in the MFP 100.

An environment information reception unit 1002 in the server 130 receives the environment information transmitted from the first MFP 100. Based on the received environment information, the environment determination unit 321 in the server 130 determines the installation environment of the first MFP 100.

A setting template generation unit 1003 in the server 130 updates the first setting file 601 received from the second MFP 120 based on the result of environment determination by the environment determination unit 321 to generate the setting template of the second MFP 120. In updating the setting file, the setting template owned in advance may be referred to based on the result of environment determination, and the first setting file 601 may be updated. Alternatively, the first setting file 601 may be updated by selecting an optimal setting value using an AI.

Processing Flow

Figure 11A:
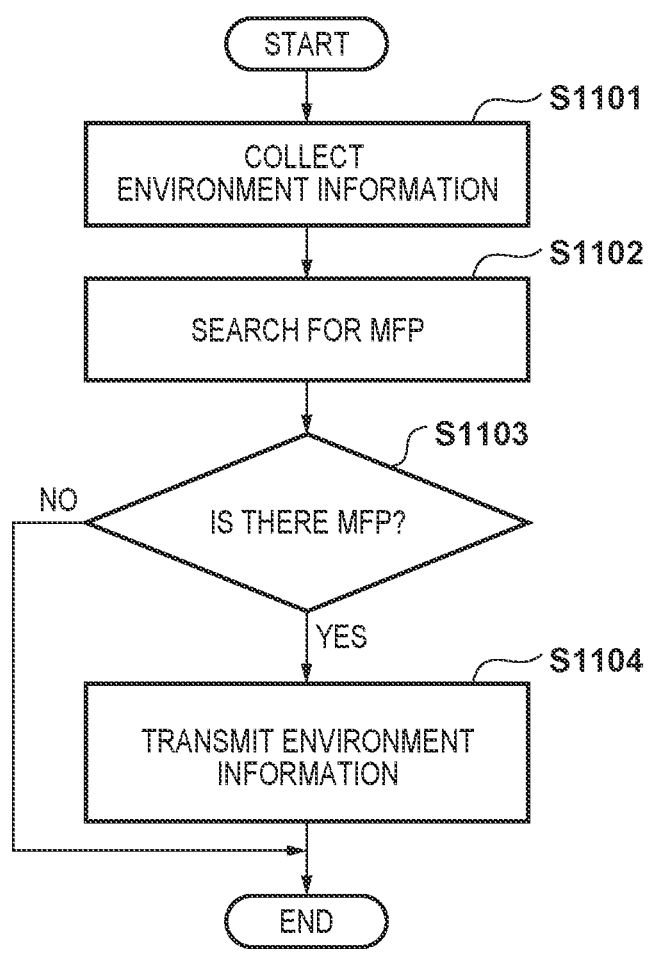
Figure 11B:
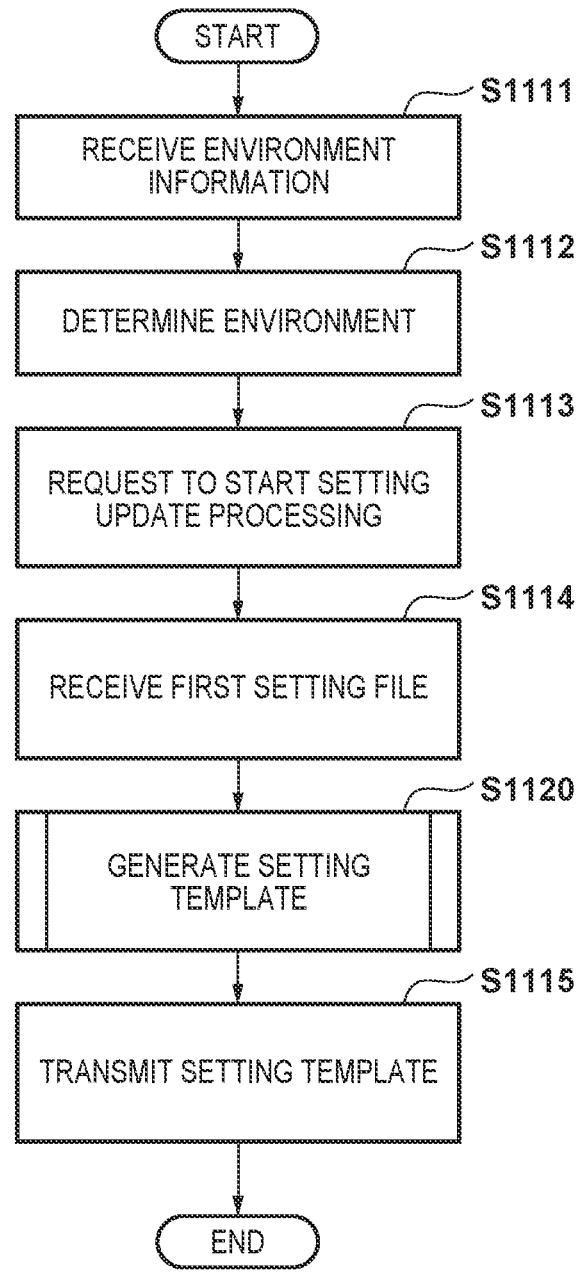

Subsequently, with reference to the flowcharts of FIG. 11A, FIG. 11B, and FIG. 11C, processing when the server 130 according to the present embodiment generates and distributes the setting template for the second MFP 120 based on the environment information collected by the first MFP 100 will be described. The application processing of the setting template of the second MFP 120 is identical to the processing described with reference to FIG. 8D, and thus the description thereof will be omitted. Note that the flowchart of FIG. 11A is the processing performed by the first MFP 100. Also, the flowcharts of FIG. 11B and FIG. 11C are processing performed by the server 130.

In the first MFP 100, at the start of operation, the environment information collection unit 320 collects information on the installation environment of the first MFP 100 (S1101). After the environment information collection, the detection unit 330 searches for the MFP (the second MFP 120) present under the identical environment (S1102). As the result of confirming the presence of the MFP (S1103), when there is no MFP, the processing ends. When there is an MFP, the environment information transmission unit 1001 transmits the environment information including information identifying the second MFP 120 to the server 130 (S1104).

Here, using FIG. 11B, environment determination processing and update processing of the first setting file 601 by the server 130 will be described. The environment information reception unit 1002 in the server 130 receives the environment information from the first MFP 100 (S1111), and the environment determination unit 321 determines the installation environment of the first MFP 100 based on the received information (S1112). After the installation environment determination, the setting template generation processing control unit 340 requests the second MFP 120 to start the setting update processing (S1113). The setting file reception unit 341 in the server 130 receives the first setting file 601 from the second MFP 120 (S1114).

Then, the setting template generation unit 1003 updates the first setting file 601 to generate the setting template of the second MFP 120 (S1120). Details of the processing of S1120 will be described later with reference to FIG. 11C. After completion of generation of the setting template, the setting template transmission unit 343 transmits the setting template to the second MFP 120 (S1115). Thereafter, the setting template reception unit 362 in the second MFP 120 receives the setting template of the second MFP 120 from the server 130. Then, the setting template application unit 363 updates the setting of the second MFP 120 based on the received setting template.

Here, details of the setting template generation processing (S1120) by the server 130 will be described using FIG. 11C. The setting template generation unit 1003 selects the setting template suitable for the installation environment based on the result of the environment determination by the environment determination unit 321 (S1121). As the result of referring to the environment determination result (S1122), when the installation environment is a SOHO, the template in the SOHO environment is selected (S1123). Also, when the installation environment is a public, the template in the public environment is selected (S1124). Then, when the installation environment is an intranet, the template in the intranet environment is selected (S1125). The first setting file 601 is updated using the selected setting template (S1126), and the processing ends.

In this way, the server 130 generates and distributes the setting template for the second MFP 120 based on the environment information collected by the first MFP 100. Although detection of the second MFP 120 by the first MFP 100 has been exemplified in the present embodiment, when the server 130 is installed in the LAN, the server 130 may detect the second MFP 120.

First Modification of Second Embodiment

In the second embodiment, an example of transmitting and receiving the first setting file 601 between the server 130 and the second MFP 120 has been described. In addition, in the present modification, an example in which the first MFP 100 relays the transfer of the first setting file 601 between the server 130 and the second MFP 120 will be described.

In the second embodiment, the second MFP 120 needs to communicate directly with the server 130 to update the first setting file 601. However, due to a setting of, for example, a network device, there is a possibility that the second MFP 120 cannot communicate with the external server 130. For example, when the IP address is filtered by setting, such as a firewall, the second MFP 120 cannot communicate with the server 130.

Thus, in the present modification, the first MFP 100 relays the transfer of the first setting file 601. First, the setting file transmission unit 360 in the second MFP 120 transmits the first setting file 601 to the first MFP 100. The first MFP 100 transmits the first setting file 601 received by the setting file reception unit 341 in the first MFP 100 to the server 130 via the setting file transmission unit 360.

The server 130 updates the first setting file 601 received by the setting file reception unit 341 by the setting template generation unit 1003 to generate the setting template of the second MFP 120. The generated setting template of the second MFP 120 is transmitted to the first MFP 100 by the setting template transmission unit 343 in the server 130. The first MFP 100 transmits the setting template of the second MFP 120 received by the setting template reception unit 362 to the second MFP 120 via the setting template transmission unit 343.

In this manner, the first MFP 100 relays the transfer of the first setting file 601 between the server 130 and the second MFP 120.

Second Modification of Second Embodiment

In the second embodiment, an example in which the server 130 updates the first setting file 601 received from the second MFP 120 to generate the setting template of the second MFP 120 and distribute it to the second MFP 120 has been described. In contrast, in the present modification, an example in which the setting template is distributed to the second MFP 120 without using the first setting file 601 will be described.

For example, similarly to the case described in the second modification of the first embodiment, in the server 130, the setting template generation unit 1003 selects the setting template optimal for the second MFP 120 among the setting templates owned in advance using the setting template selection table 901 as illustrated in FIG. 9. In other words, the setting template selection table 901 is referred to based on the identification information (such as the model ID) of the second MFP 120 and the determination result of the installation environment, and the optimal setting template is selected. Then, the setting template transmission unit 343 transmits the selected setting template to the second MFP 120. In the second MFP 120, the setting template application unit 363 applies the setting template received by the setting template reception unit 362 to ensure the setting optimum for the installation environment.

In this manner, the server 130 distributes the setting template of the second MFP 120 without using first setting file 601.

Other Modifications

In the embodiments described above, it has been exemplified that the first MFP 100 generates and distributes the setting template for the second MFP 120 as the model different from that of the first MFP 100, but the target for generation and distribution of the setting template may be the model identical to that of the first MFP 100. That is, the first MFP 100 has the functions similar to the setting file transmission unit 360, the setting update processing control unit 361, the setting template reception unit 362, and the setting template application unit 363 in the second MFP 120. This allows generation and distribution processing of the setting template with the model identical to that of the first MFP 100.

The present invention allows easily setting the setting template suitable for the installation environment to the information processing apparatus under the user environment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-005820, filed Jan. 18, 2022, which is hereby incorporated by reference herein in its entirety.

What is claimed is:

1. An information processing system, comprising:
a first information processing apparatus; and
a second information processing apparatus, wherein
the first information processing apparatus includes:
  at least one processor; and
  at least one memory storing instructions that, when executed by the at least one processor, cause the first information processing apparatus to
  information on a surrounding environment of the first information processing apparatus;
  determine an installation environment of the first information processing apparatus based on the information;
  detect the second information processing apparatus present under an installation environment identical to the installation environment;
  generate a setting template for setting the second information processing apparatus based on the installation environment; and
  transmit the setting template to the second information processing apparatus, and
the second information processing apparatus includes:
  at least one processor; and
  at least one memory storing instructions that, when executed by the at least one processor of the second information processing apparatus, cause the second information processing apparatus to
  receive the setting template; and
  apply the received setting template to the second information processing apparatus, wherein the at least one processor of the first information processing apparatus further causes the first information processing apparatus to:
  receive from the second information processing apparatus a first setting file that describes a setting item of the second information processing apparatus; and
  generate a second setting file that describes a setting item of the first information processing apparatus, and
wherein the first information processing apparatus, when generating the setting template, is configured to
compare setting items of the first setting file received from the second information processing apparatus with setting items of the generated second setting file, and
for all setting items of the first setting file,
  i) copy a setting value of an identical setting item in the second setting file to the first setting file to generate the setting template,
  ii) for a setting item present only in the first setting file, refer to a blacklist of setting items, and update to OFF the setting items registered with the blacklist of the setting items, and
  iii) for a setting item not registered with the blacklist, maintain original setting values without performing update processing.

2. The information processing system according to claim 1, wherein
the at least one processor of the first information processing apparatus further causes the first information processing apparatus to apply a setting to the first information processing apparatus based on the installation environment.

3. The information processing system according to claim 1, wherein
the setting template is a setting template related to a security.

4. The information processing system according to claim 1, wherein the first information processing apparatus, when detecting the second information processing apparatus, detects an apparatus that is a model identical to a model of the first information processing apparatus or a model of a group from a vendor identical to a group from a vendor of the first information processing apparatus, as the second information processing apparatus.

5. The information processing system according to claim 1, wherein the first information processing apparatus detects the second information processing apparatus present under an installation environment identical to the installation environment of the first information processing apparatus.

6. The information processing system according to claim 5, wherein
the first information processing apparatus, when detecting the second information processing apparatus:
  transmits a broadcast that requests for a MAC address to an apparatus present in a network identical to the first information processing apparatus; and
  confirms vendor information and a model ID of the received MAC address to detect the second information processing apparatus.

7. The information processing system according to claim 1, wherein
the information on the surrounding environment includes information on another information processing apparatus, and
the first information processing apparatus generates the setting template for setting the second information processing apparatus further based on information on the second information processing apparatus.

8. The information processing system according to claim 1, wherein
the first information processing apparatus generates the setting template by selecting a setting template suitable for the second information processing apparatus from a plurality of setting templates based on the information on the surrounding environment and identification information of the second information processing apparatus to generate the setting template for setting the second information processing apparatus.

9. The information processing system according to claim 1, wherein
the at least one processor of the second information processing apparatus causes the second information processing apparatus to apply the setting template when the first information processing apparatus is an apparatus registered in advance or an apparatus authenticated by the second information processing apparatus.

10. An information processing system, comprising: a first information processing apparatus;
a second information processing apparatus; and
a server apparatus, wherein
the first information processing apparatus includes:
at least one processor; and
at least one memory storing instructions that, when executed by the at least one processor, cause the first information processing apparatus to
collect environment information that indicates a surrounding environment of the first information processing apparatus;
detect the second information processing apparatus; and
transmit the environment information and identification information of the second information processing apparatus to the server apparatus,
the server apparatus includes:
at least one processor; and
at least one memory storing instructions that, when executed by the at least one processor of the server apparatus, cause the server apparatus to
receive the environment information and the identification information;
determine an installation environment of the first information processing apparatus based on the environment information;
generate a setting template for setting the second information processing apparatus based on the installation environment and the identification information; and
transmit the setting template to the second information processing apparatus, and
the second information processing apparatus includes:
at least one processor; and
at least one memory storing instructions that, when executed by the at least one processor of the second information processing apparatus, cause the second information processing apparatus to
receive the setting template; and
apply the received setting template to the second information processing apparatus,
wherein the at least one processor of the server apparatus further causes the server apparatus to
receive from the second information processing apparatus a first setting file that describes a setting item of the second information processing apparatus; and generate a second setting file that describes a setting item of the first information processing apparatus, and
wherein the server apparatus, when generating the setting template, is configured to
compare setting items of the first setting file received from the second information processing apparatus with setting items of the generated second setting file, and
for all setting items of the first setting file,
i) copy a setting value of an identical setting item in the second setting file to the first setting file to generate the setting template,
ii) for a setting item present only in the first setting file, refer to a blacklist of setting items, and update to OFF the setting items registered with the blacklist of the setting items, and
iii) for a setting item not registered with the blacklist, maintain original setting values without performing update processing.

11. The information processing system according to claim 10, wherein the at least one processor of the server apparatus causes the server apparatus to, when the setting template cannot be transmitted to the second information processing apparatus, transmit the setting template to the first information processing apparatus, and
the at least one processor of first information processing apparatus further causes the first information processing apparatus to receive the setting template from the server apparatus, and
transmit the setting template received from the server apparatus to the second information processing apparatus.

12. The information processing system according to claim 10, wherein
the server apparatus, when generating the setting template, selects a setting template suitable for the second information processing apparatus from a plurality of setting templates based on the installation environment and the identification information to generate the setting template for setting the second information processing apparatus.

13. The information processing system according to claim 1, wherein
the first information processing apparatus and the second information processing apparatus are image forming apparatuses.

14. An information processing apparatus, comprising:
at least one processor; and
at least one memory storing instructions that, when executed by the at least one processor, cause the information processing apparatus to
collect information on a surrounding environment of the information processing apparatus;
determine an installation environment of the information processing apparatus based on the information;
detect another information processing apparatus;
generate a setting template for setting the other information processing apparatus based on the installation environment; and
transmit the setting template to the other information processing apparatus,
wherein the at least one processor further causes the information processing apparatus to
receive from the other information processing apparatus a first setting file that describes a setting item of the other information processing apparatus; and generate a second setting file that describes a setting item of the information processing apparatus, and
wherein the information processing apparatus, when generating the setting template, is configured to
compare setting items of the first setting file received from the other information processing apparatus with setting items of the generated second setting file, and
for all setting items of the first setting file,
  i) copy a setting value of an identical setting item in the second setting file to the first setting file to generate the setting template,
  ii) for a setting item present only in the first setting file, refer to a blacklist of setting items, and update to OFF the setting items registered with the blacklist of the setting items, and
  iii) for a setting item not registered with the blacklist, maintain original setting values without performing update processing.

15. A server apparatus that communicates with a first information processing apparatus and a second information processing apparatus, the server apparatus comprising
at least one processor; and
at least one memory storing instructions that, when executed by the at least one processor, cause the server apparatus to
receive environment information indicating a surrounding environment of the first information processing apparatus and identification information of the second information processing apparatus;
determine an installation environment of the first information processing apparatus based on the environment information;
generate a setting template for setting the second information processing apparatus based on the installation environment and the identification information; and
transmit the setting template to the second information processing apparatus, wherein the at least one processor further causes the server apparatus to
receive from the second information processing apparatus a first setting file that describes a setting item of the second information processing apparatus; and
generate a second setting file that describes a setting item of the first information processing apparatus, and
wherein the server apparatus, when generating the setting template, is configured to
compare setting items of the first setting file received from the second information processing apparatus with setting items of the generated second setting file, and
for all setting items of the first setting file,
  i) copy a setting value of an identical setting item in the second setting file to the first setting file to generate the setting template,
  ii) for a setting item present only in the first setting file, refer to a blacklist of setting items, and update to OFF the setting items registered with the blacklist of the setting items, and
  iii) for a setting item not registered with the blacklist, maintain original setting values without performing update processing.

16. A control method of an information processing apparatus, comprising:
collecting information on a surrounding environment of the information processing apparatus;
determining an installation environment of the information processing apparatus based on the information;
detecting another information processing apparatus;
generating a setting template for setting the other information processing apparatus based on the installation environment; and
transmitting the setting template to the other information processing apparatus,
wherein the control method further comprises:
  receiving a first setting file from the other information processing apparatus that describes a setting item of the other information processing apparatus; and
  generating a second setting file that describes a setting item of the information processing apparatus, and
wherein in the generating a setting template,
setting items of the first setting file received from the other information processing apparatus are compared with setting items of the generated second setting file, and
for all setting items of the first setting file,
  i) a setting value of an identical setting item in the second setting file is copied to the first setting file to generate the setting template,
  ii) for a setting item present only in the first setting file, a blacklist of setting items is referred to, and the setting items registered with the blacklist of the setting items are updated to OFF, and
  iii) for a setting item not registered with the blacklist, the original setting values are maintained without performing update processing.

17. A control method of a server apparatus that communicates with a first information processing apparatus and a second information processing apparatus, the control method comprising:
receiving environment information indicating a surrounding environment of the first information processing apparatus and identification information of the second information processing apparatus;
determining an installation environment of the first information processing apparatus based on the environment information;
generating a setting template for setting the second information processing apparatus based on the installation environment and the identification information; and
transmitting the setting template to the second information processing apparatus,
wherein the control method further comprises:
  receiving a first setting file from the second information processing apparatus that describes a setting item of the second information processing apparatus; and
  generating a second setting file that describes a setting item of the first information processing apparatus, and
wherein in the generating a setting template,
setting items of the first setting file received from the second information processing apparatus are compared with setting items of the generated second setting file, and
for all setting items of the first setting file,
  i) a setting value of an identical setting item in the second setting file is copied to the first setting file to generate the setting template,
  ii) for a setting item present only in the first setting file, a blacklist of setting items is referred to, and the setting items registered with the blacklist of the setting items are updated to OFF, and
  iii) for a setting item not registered with the blacklist, the original setting values are maintained without performing update processing.

18. A non-transitory computer-readable storage medium storing a program to cause a computer to execute a control method of an information processing apparatus, the control method comprising:
  collecting information on a surrounding environment of the information processing apparatus;
  determining an installation environment of the information processing apparatus based on the information;
  detecting another information processing apparatus;
  generating a setting template for setting the other information processing apparatus based on the installation environment; and
  transmitting the setting template to the other information processing apparatus,
  wherein the control method further comprises:
    receiving a first setting file from the other information processing apparatus that describes a setting item of the other information processing apparatus; and
    generating a second setting file that describes a setting item of the information processing apparatus, and
  wherein in the generating a setting template,
  setting items of the first setting file received from the other information processing apparatus are compared with setting items of the generated second setting file, and
  for all setting items of the first setting file,
    i) a setting value of an identical setting item in the second setting file is copied to the first setting file to generate the setting template,
    ii) for a setting item present only in the first setting file, a blacklist of setting items is referred to, and the setting items registered with the blacklist of the setting items are updated to OFF, and
    iii) for a setting item not registered with the blacklist, the original setting values are maintained without performing update processing.

19. A non-transitory computer-readable storage medium storing a program to cause a computer to execute a control method of a server apparatus that communicates with a first information processing apparatus and a second information processing apparatus, the control method comprising:
  receiving environment information indicating a surrounding environment of the first information processing apparatus and identification information of the second information processing apparatus;
  determining an installation environment of the first information processing apparatus based on the environment information;
  generating a setting template for setting the second information processing apparatus based on the installation environment and the identification information; and
  transmitting the setting template to the second information processing apparatus,
  wherein the control method further comprises:
    receiving a first setting file from the second information processing apparatus that describes a setting item of the second information processing apparatus; and
    generating a second setting file that describes a setting item of the first information processing apparatus, and
  wherein in the generating a setting template,
  setting items of the first setting file received from the second information processing apparatus are compared with setting items of the generated second setting file, and
  for all setting items of the first setting file,
    i) a setting value of an identical setting item in the second setting file is copied to the first setting file to generate the setting template,
    ii) for a setting item present only in the first setting file, a blacklist of setting items is referred to, and the setting items registered with the blacklist of the setting items are updated to OFF, and
    iii) for a setting item not registered with the blacklist, the original setting values are maintained without performing update processing.

\* \* \* \* \*